United States Patent
Salter et al.

(10) Patent No.: US 11,140,514 B2
(45) Date of Patent: Oct. 5, 2021

(54) METHOD AND APPARATUS FOR WIRELESS PROXIMITY BASED COMPONENT INFORMATION PROVISION

(71) Applicant: FORD GLOBAL TECHNOLOGIES, LLC, Dearborn, MI (US)

(72) Inventors: Stuart C. Salter, White Lake, MI (US); Pietro Buttolo, Dearborn Heights, MI (US); James J. Surman, Clinton Township, MI (US); James Stewart Rankin, II, Novi, MI (US); Stephen Ronald Tokish, Sylvania, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 1189 days.

(21) Appl. No.: 14/940,921

(22) Filed: Nov. 13, 2015

(65) Prior Publication Data
US 2017/0142552 A1 May 18, 2017

(51) Int. Cl.
*H04W 4/02* (2018.01)
*H04W 4/80* (2018.01)
*G07C 5/00* (2006.01)

(52) U.S. Cl.
CPC ............ *H04W 4/023* (2013.01); *G07C 5/008* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 2002/0184062 A1* | 12/2002 | Diaz | G06Q 10/06 701/29.3 |
| 2011/0210830 A1 | 9/2011 | Talty et al. | |
| 2013/0017816 A1 | 1/2013 | Talty et al. | |
| 2013/0304278 A1 | 11/2013 | Chen | |
| 2014/0188348 A1 | 7/2014 | Gautama et al. | |
| 2015/0048927 A1* | 2/2015 | Simmons | G07C 9/00309 340/5.61 |

FOREIGN PATENT DOCUMENTS

| | | | |
|---|---|---|---|
| CN | 101718991 A | | 6/2010 |
| CN | 103963760 A | * | 8/2014 |
| CN | 104392628 A | | 3/2015 |
| CN | 104900083 A | | 9/2015 |

* cited by examiner

*Primary Examiner* — Christian Chace
(74) *Attorney, Agent, or Firm* — Michael Spenner; Brooks Kushman

(57) ABSTRACT

A system includes a processor configured to provide an informational report to a wireless device about a vehicle component associated with a BLUETOOTH low energy (BTLE) chip, affixed to a vehicle, when the wireless device is determined to be within a predefined proximity to the BTLE chip. This can include information such as operational and wear status, but also can be purely explanatory, as to what the function of the component is.

20 Claims, 3 Drawing Sheets

METHOD AND APPARATUS FOR WIRELESS PROXIMITY BASED COMPONENT INFORMATION PROVISION

TECHNICAL FIELD

The illustrative embodiments generally relate to a method and apparatus for wireless proximity based component information provision.

BACKGROUND

Vehicles are incredibly complex machines, with a variety of systems, subsystems, components and modules. Many of these systems need occasional maintenance or updates, in order to maintain optimal working conditions and to avoid serious deterioration of these or other components. For example, oil levels, tire pressure, brake pad wear, light conditions, etc. are all systems that a user can maintain, but often a user will not know how to check the current state of these systems, or be aware that the systems require maintenance.

Also, with respect to rental vehicles, a user may wish to inspect the vehicle before beginning a rental, in order to ensure that the user is not charged for already existing damage or deteriorated vehicle systems. To be thorough, however, this would require a trip to a mechanic, which is not something a typical renter would do before engaging in a rental contract.

SUMMARY

In a first illustrative embodiment, a system includes a processor configured to provide an informational report to a wireless device about a vehicle component associated with a BLUETOOTH low energy (BTLE) chip, affixed to a vehicle, when the wireless device is determined to be within a predefined proximity to the BTLE chip.

In a second illustrative embodiment, a system includes a processor configured to provide a location report including a vehicle parking spot identifier in response to a received and verified location request from a wireless device, when the processor determines that the vehicle is located within a predefined proximity of a BLUETOOTH low energy (BTLE) chip installed at the parking spot.

In a third illustrative embodiment, a computer-implemented method includes determining that a wireless device is located within a predefined proximity to a BLUETOOTH low energy chip (BTLE) installed in a vehicle, using a vehicle computer. The method also includes identifying a vehicle component associated with the BTLE chip and providing a status report, to the wireless device, of the vehicle component associated with the BTLE chip.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
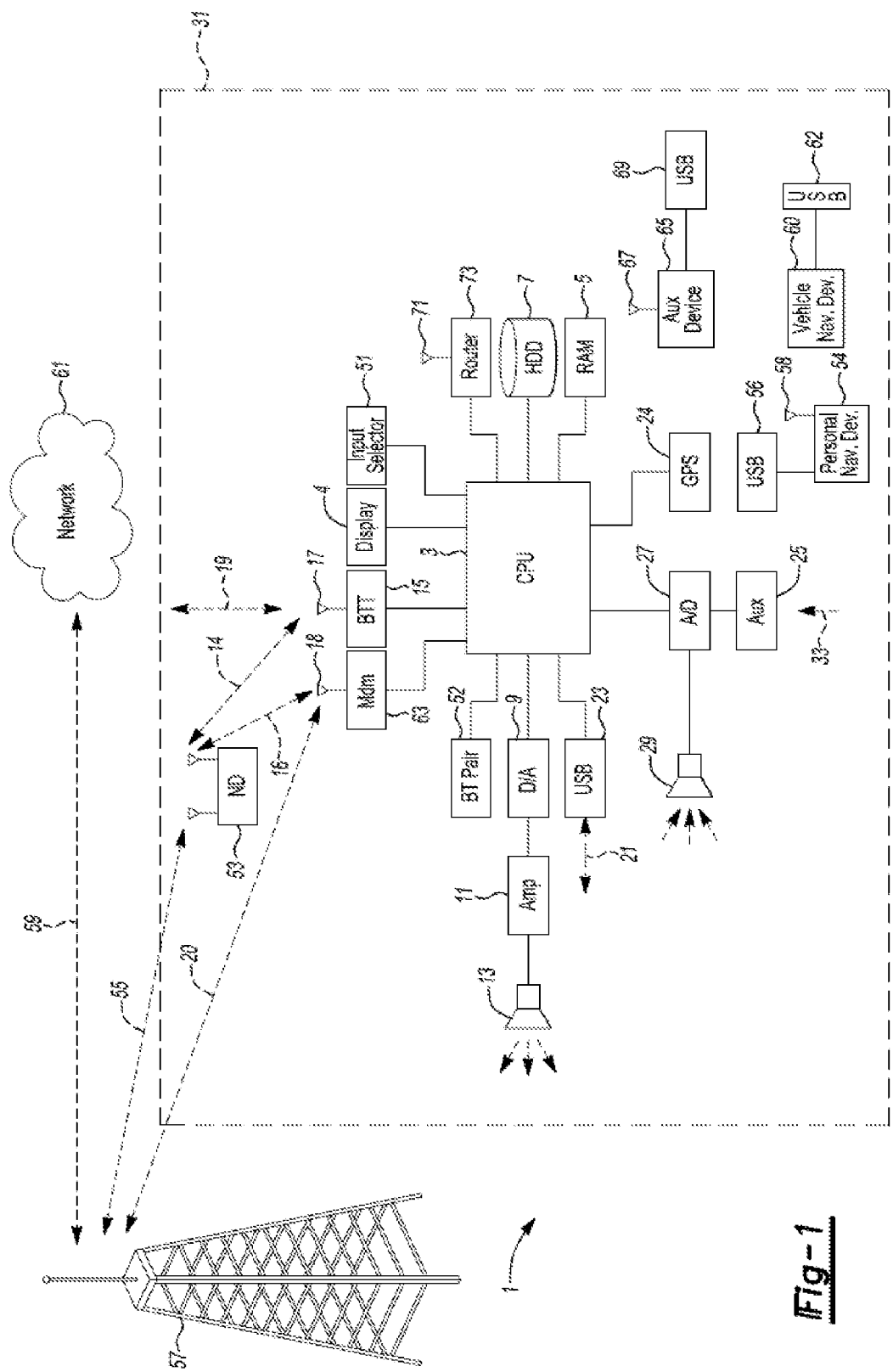
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

There are a number of reasons why a driver might want a quick report from a vehicle system or component. For example, if a driver is renting or borrowing a vehicle, the driver may want to make sure the vehicle is in drivable condition. If the driver uses the vehicle frequently, it may be nice to have updates on certain components and fuel levels, at reasonable intervals. If a driver hears a noise or feels something "off" in the vehicle, it would be nice to be able to check a number of systems without having to take the vehicle to a mechanic.

In order to facilitate the delivery of component information, BLUETOOTH low energy (BTLE) chips can be added to a vehicle. These are very inexpensive to add to a vehicle, and can be added at specified locations, so that the presence of the chips can, for example, identify a particular component proximate to an identifying chip, or, for example, a plurality of these chips can be used to determine the location of a receiving device (such as a phone) placed somewhere amidst deployed chips.

Figure 2:
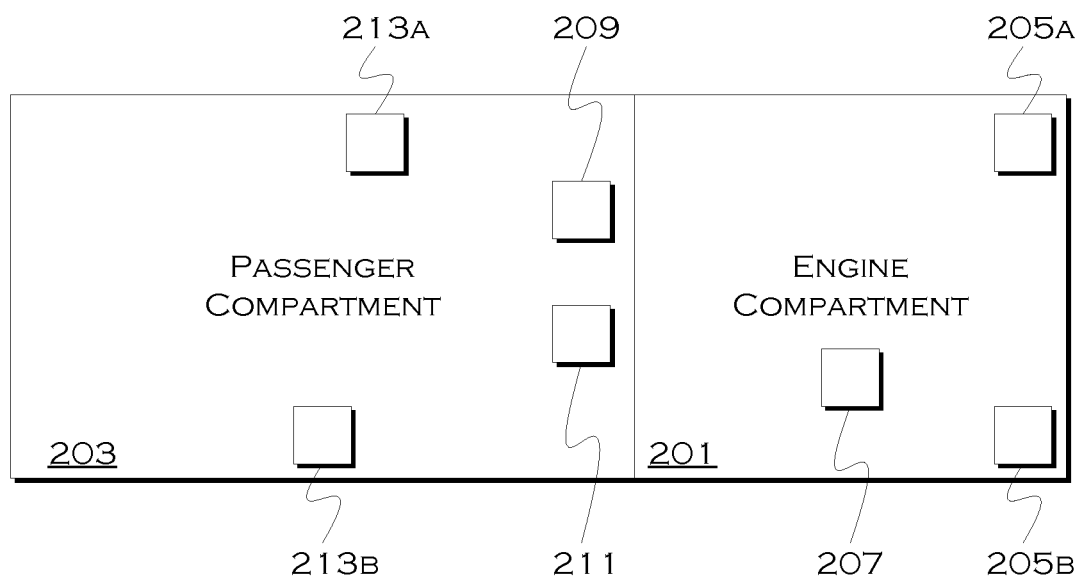
FIG. 2 shows an illustrative vehicle BTLE sensor arrangement.

FIG. 2 shows an illustrative vehicle BTLE sensor arrangement. In this illustrative example, a passenger compartment 203 and engine compartment 201 are shown. Sensors are deployed at a variety of illustrative locations in this example, including two sensors 205A and 205B deployed at the location of headlights, one sensor 207 deployed next to an oil cap, a center stack sensor 211, an instrument panel sensor 209 and two side door sensors 213A and 213B. These sensor locations are merely provided as examples, some or all of these can be omitted and/or additional sensors can easily be added.

The sensors can serve dual purposes. It is possible to associate a particular system or report with each sensor, so that if a device is within a certain proximity to the sensor it is assumed that the user is attempting to obtain data relating to the device or report affiliated with the particular sensor. For example, placing the device near 205A or 205B could result in a light-condition report. Placing the device near 207 could result in an oil life report. Placing the device near 209 could result in a fuel level report (another sensor could also be provided at the fuel cap). Placing the device near 211 could result in a vehicle settings report, and placing the device near 213A or 213B could result in a report relating to the status of window and child locks for the respective rear doors.

The other purpose that can be fulfilled by the sensors is using the proximity of a device to a plurality of the sensors to triangulate the location of the device. Thus, information can be provided about other vehicle components, not equipped with specific sensors, by determining that the device is located near one of those components based on the device's deployment within an array of the sensors.

Drivers may also request certain information upon exiting or entering a vehicle. Relevant information including, but not limited to, fuel levels, distance to empty, etc. can be transmitted for retrieval while the driver is away from the vehicle. Critical warnings can also be uploaded if critical conditions (low air, low oil, etc) occur. The chips can also upload data when a rental vehicle arrives in a stall or in a return-lane provided with receivers. Automatic fuel level, mileage, etc. can be uploaded directly to the rental car company without an attendant having to inspect the vehicle.

Figure 3:
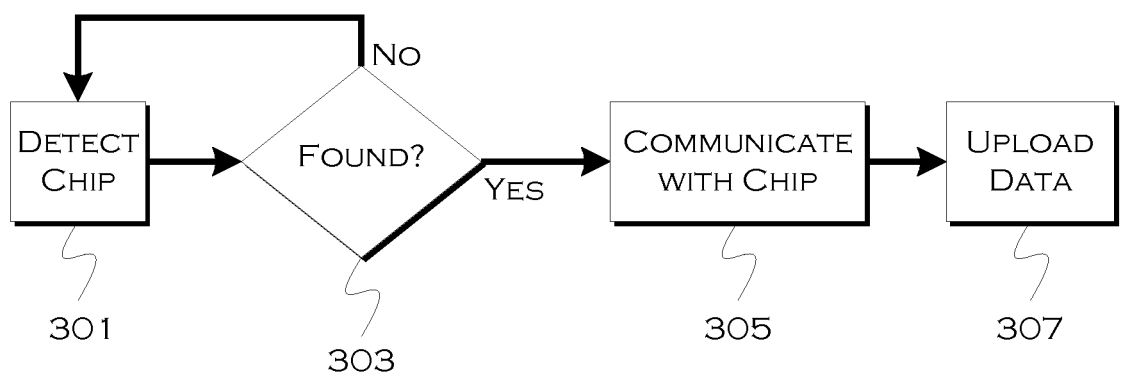
FIG. 3 shows an illustrative process for communicating system data.

FIG. 3 shows an illustrative process for communicating system data. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process is running on a mobile device or other receiving device. The device is placed in range of a BTLE chip (or chips) installed in a vehicle, and detects the presence of a BTLE signal 301. Once a signal has been found 303, the process communicates with the chip to obtain the appropriate data associated with the chip. Alternatively, the chip can be used to identify a device location, and the device can communicate with an appropriate vehicle transmitter (a BTLE chip or other wireless system) 305. Information relating to a system proximate to the device can be obtained from either one of the chips or another vehicle computer 307. Data can be obtained on the basis of placing the device within a certain proximity to a system or chip, for example, or on the basis of a vehicle start/stop, for example.

Figure 4:
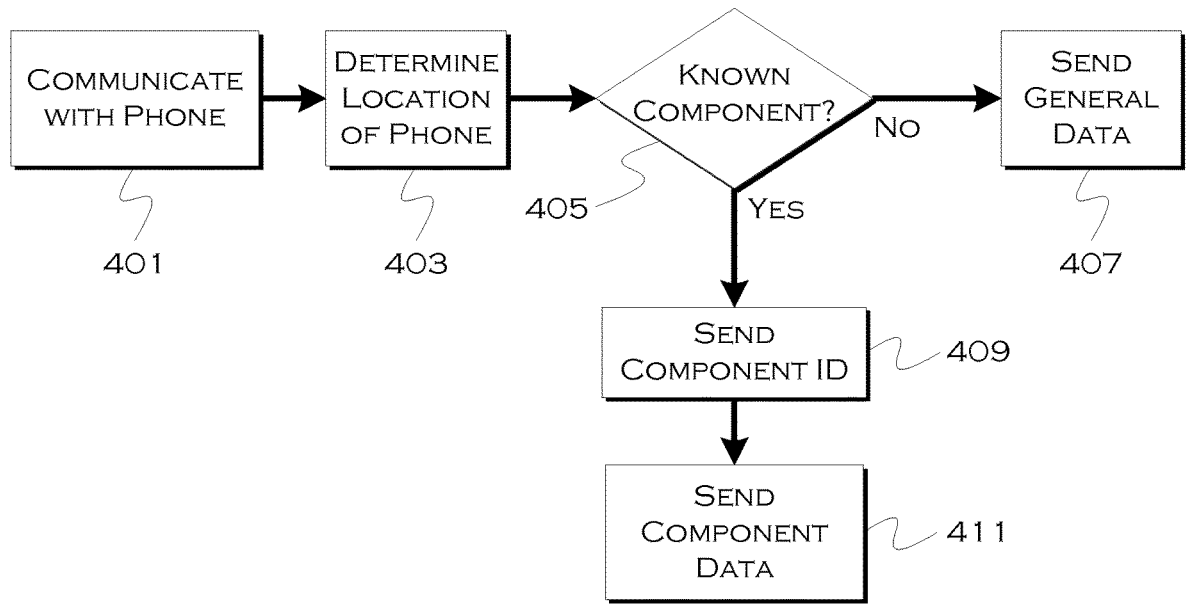
FIG. 4 shows an illustrative process for providing system information from BTLE sensors.

FIG. 4 shows an illustrative process for providing system information from BTLE sensors. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, one or more BTLE chips communicate with a mobile device to determine whether the device is located in a position whereby data should be received (e.g., near a particular system for which information can be provided). The chip(s) communicate with the device 401, and based on signal strength, for example, can determine how close the device is to each chip. The proximity of the device to each chip can be used to determine the location of the phone 403 (for example, if a radius around each chip is set at the distance from the phone to the chip, then the intersection of circles defined by the radius and chip-as-center indicates the position of the device).

If the phone location corresponds to a known component or report 405 (e.g., near an oil cap to get an oil report, near a tire to get a brake and air level report, near an engine block to get a general engine report, etc.), the process may send the appropriate report. If there is no particular report or location associated with the location (e.g., the phone is merely in a driver pocket sitting in a driver seat), a driver-customizable generalized report may be sent 407. This could be, for example, a report of data that the driver wants every time the vehicle is used. Temporal limitations can also be affiliated with this report to avoid over-reporting (e.g., it can be sent once per trip, once per day, etc.)

If there is a particular component (or report) associated with the specific location of the phone, the process will send an identification of the component or report 409, so that the customer can ensure that the appropriate system data is being received. The relevant component status data, configuration data or other report can also be sent 411.

As previously noted, if the device is in a predefined proximity to a BTLE chip, the chip may report a status of a component or report associated therewith. If the device is out of this proximity, then the physical location of the device may be compared to components or reports to determine which component is near the device. A status, configuration or report may then be sent for that component.

Figure 5:
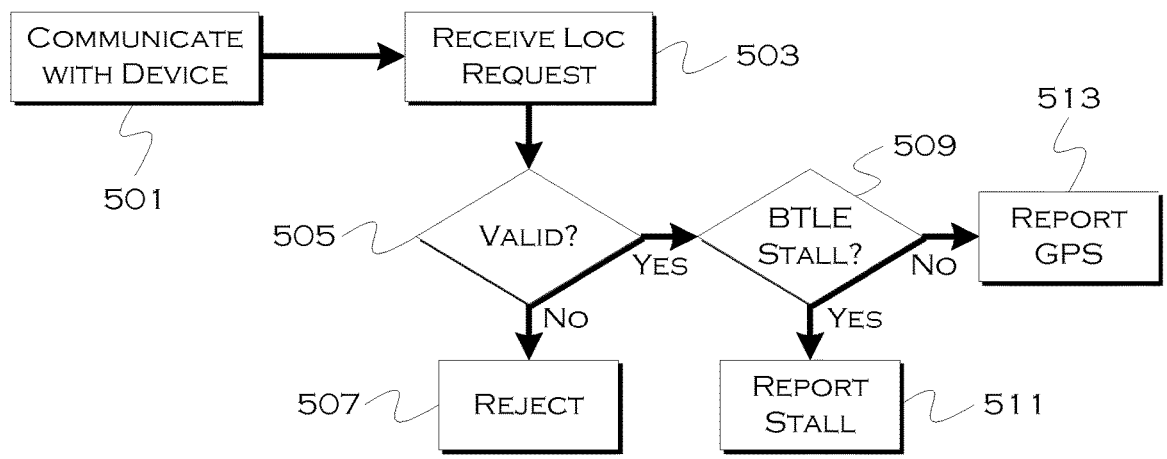
FIG. 5 shows an illustrative process for vehicle location reporting using BTLE sensors.

FIG. 5 shows an illustrative process for vehicle location reporting using BTLE sensors. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a vehicle telematics system can receive a remote request to identify a vehicle location (such as when a renter is trying to find the vehicle in a lot). The BTLE chip or chips can communicate with another chip installed in a rental stall or proximate to a rental parking spot, which can be used to identify the location of the vehicle. If there is no chip present within communication range, the process may simply identify the GPS location of the vehicle. Also, once a device comes within 30 feet of the BTLE chip, the chip can communicate with the device, so an alert can be sent once the user is near the vehicle itself.

In this example, the process running on the vehicle communicates with a device through, for example, a vehicle modem and telematics system 501. As part of the communication, a request for a vehicle location is received 503. If the requesting device is permitted (through some affiliation with the vehicle, such as previously-paired, or through transmission of a valid security code) to access the vehicle location 505, the process will continue. Otherwise the request will be rejected 507.

In this example, the process will then check to see if there is a BTLE communication device installed exterior to the vehicle and near the vehicle 509. For example, a chip could be placed in a concrete barrier or on a sign post that would be near another chip in a vehicle bumper or fender. If the chips are within a certain distance, it is assumed that the vehicle is located in the parking space associated with the exterior chip. If such a device is found, the process will report the particular location 511. Otherwise, the process will simply report vehicle GPS coordinates.

While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
provide an informational report to a wireless device about a vehicle component having a defined relationship with a specific BLUETOOTH low energy (BLE) chip, affixed to a vehicle, when the wireless device is determined to be within a predefined proximity to the BLE chip.

2. The system of claim 1, wherein the informational report includes a component operational status.

3. The system of claim 1, wherein the informational report includes a component wear status.

4. The system of claim 1, wherein the informational report includes a component fluid level status.

5. The system of claim 1, wherein the processor is configured to determine a device location based on proximity of the device to a plurality of BLE chips.

6. The system of claim 5, wherein the plurality of BLE chips includes at least three chips.

7. The system of claim 5, wherein the processor is configured to determine the proximity of the device to the BLE chips based on signal strength of a signal between the BLE chips and the device.

8. The system of claim 5, wherein the processor is configured to provide an information report about a component located within a predefined proximity of the device location.

9. The system of claim 8, wherein the processor is configured to provide a general, driver-configured, vehicle report if there is no component located within the predefined proximity of the device location.

10. A system comprising:
a processor configured to:
provide a location report including a vehicle parking spot identifier in response to a received and verified location request from a wireless device, when the processor determines that the vehicle is located within a predefined proximity of a BLUETOOTH low energy (BLE) chip installed at the parking spot.

11. The system of claim 10, wherein the processor is configured to verify the location request based on the wireless device having been previously paired with the vehicle.

12. The system of claim 10, wherein the processor is configured to verify the location request based on a security code included with the location request.

13. The system of claim 10, wherein the processor is configured to determine that the vehicle is located within the predefined proximity of the BLE chip installed at the parking spot based on communication between a vehicle installed BLE chip and the BLE chip installed at the parking spot.

14. The system of claim 13, wherein the predetermined proximity is determined based on a signal strength of the communication.

15. The system of claim 13, wherein the vehicle installed BLE chip is installed in a front or rear bumper.

16. The system of claim 10, wherein the processor is configured to provide a GPS location of the vehicle, when the processor determines that the vehicle is not located within the predefined proximity of the BLE chip installed in the parking spot.

17. A computer-implemented method comprising:
determining that a wireless device is located within a predefined proximity to a BLUETOOTH low energy chip (BLE) installed in a vehicle, using a vehicle computer;
identifying a vehicle component associated with the BLE chip; and
providing a status report, to the wireless device, of the vehicle component associated with the BLE chip.

18. The method of claim 17, wherein the determining includes determining a distance between the device and the BLE chip based on a signal strength of communication between the device and the BLE chip.

19. The method of claim 17, wherein the method further includes determining a wireless device location based on signal strength between a plurality of secondary BLE chips and the wireless device, if the wireless device is not within the predefined proximity of the BLE chip.

20. The method of claim 19, wherein the method further includes identifying a vehicle component associated with the wireless device location and providing the status report for the vehicle component associated with the wireless device location.

\* \* \* \* \*